Jan. 13, 1959     M. L. LAPPIN ET AL     2,868,548
EXPANDING SANDER CHUCK
Filed Oct. 12, 1956

MILTON L. LAPPIN
PAUL I. ZANDBERG
INVENTORS.

BY
ATTORNEY.

United States Patent Office 2,868,548
Patented Jan. 13, 1959

2,868,548

EXPANDING SANDER CHUCK

Milton L. Lappin and Paul I. Zandberg,
Los Angeles, Calif.

Application October 12, 1956, Serial No. 615,519

1 Claim. (Cl. 279—2)

The present invention relates broadly to chucks, and specifically to a chuck of the type which is adapted to releasably hold a sander ring. At the present time, sander rings are usually of one piece and utilized for various purposes, among which may be mentioned that of grinding and polishing dentures.

An object of the invention is the provision of a chuck which allows a ready placement and replacement of sander rings on the chuck within a minimum of time, and wherein the sander ring is positively gripped against slippage by the chuck.

We have found that many sanders comprise a straight strip of abrasive material, such as a sand strip, the ends of the strip adapted to encircle a chuck, with ends of the strip passed through a slot in the chuck for the purpose of holding the strip tightly on the chuck. Such a method and construction has not proved satisfactory in actual practice, and is time consuming when it becomes necessary to renew the strip. With the present invention, the operator may remove the sanding ring from the chuck without the necessity of stopping rotation of a mandrel which is turning the chuck, with the result that the old sander ring may be removed and a new one placed on the chuck. Obviously, this will be of benefit, in that the operator does not, of necessity, have to stop the motor and restart the same after the new ring is placed on the chuck.

Other objects include a sander chuck of attractive appearance, fool-proof in operation, of efficient design, and generally superior to sander chucks now known to the inventors.

With the above mentioned and other objects in view, the invention consists in the novel and useful provision, formation, construction, association, and relative arrangement of parts, members and features, all as shown in one embodiment in the accompanying drawing, described generally, and more particularly pointed out in the claim.

Figure 1:
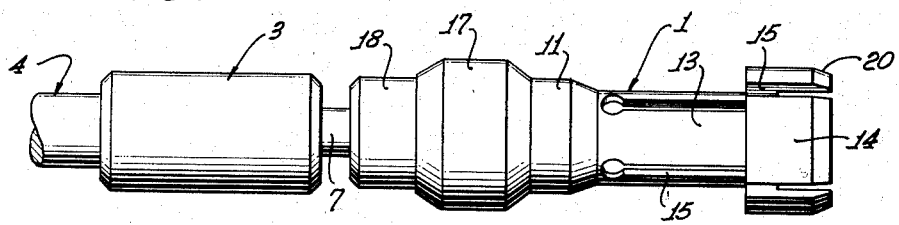
Figure 1 is a fragmentary side elevation of the chuck shown as an entirety.

Referring now with particularity to the drawing, the invention includes a chuck 1, axially movable upon a spindle 2, which spindle is secured to a connector 3, the connector in turn adapted to be placed upon a mandrel 4 for the purpose of rotating the spindle and the said chuck.

The connector 3 has a tapered or conical bore 5 for receiving the conical end portion of the mandrel 4 in close fit engagement, and said connector is likewise provided with a uniform bore 6 for receiving the cylindrical extention 7 of spindle 2. This extension is reduced in diameter relative to a further length of the spindle, designated as 9, which is of uniform diameter, and a tapered or conical end portion 9. The chuck 1 constitutes a sleeve carried on the portion 8 of the spindle, and the said sleeve has an externally threaded end 10 and a large diameter portion at 11 which provides an annular shoulder at 12, the enlarged portion 11 being reduced in diameter and merging with a cleft or longitudinally slotted portion 13 terminating in a cup type head, designated generally as 14, the said head having a greater diameter than the diameter of the portion 13. Both the cup type head and the portion 13 are provided with quadrifid clefts or slots, as shown at 15. The cup type head has a base portion and an annular portion provided with the four clefts or slots. The base where it merges with the portion 13 is provided with a tapered or conical bore 16. The conical end 9 of the spindle is received in the conical bore 16. Carried on the spindle 8 is a ring 17, one end of which abuts the shoulder 12 of enlargement 11 and a cap type nut 18 is threaded to threads 10 and abuts the opposite edge of the said ring, as shown at 19. The ring is free to rotate on the spindle. The peripheral surface of the portion 14 of the head is tapered at 20. The head and the portion 13 is preferably formed of spring-like material so that this portion may radially move consequent upon longitudinal movement of the sleeve relative to the spindle.

Figure 2:
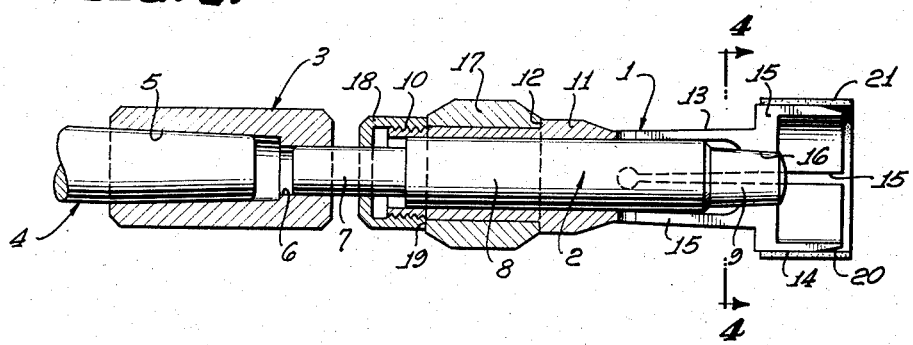
Figure 2 is a longitudinal sectional view of the chuck and associated parts shown in Figure 1.
Figure 3:
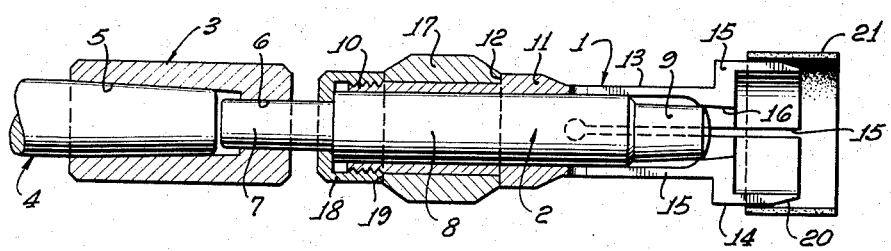
Figure 3 is a view similar to that of Figure 2, certain parts being in moved position, and, Figure 4 is a sectional view on the line 4—4 of Figure 2, and on an enlarged scale.
Figure 4:
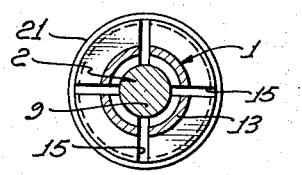

The operation, uses and advantages of the invention just described are as follows:

The head is adapted to be surrounded by a ring of abrasive surface material 21. This ring is readily applied to the periphery of the head by grasping the ring 17 and moving the chuck 1 to the right of the showing of Figure 2 on the spindle 2, as illustrated in Figure 3. When this occurs, the opposed frusto-conical surfaces of the end 9 and bore 16 separate, as shown in Figure 3, to the end that the four portions of the head are allowed to move radially inwardly to release the abrasive ring 21 from said head whereupon the worn abrasive ring may be replaced by a new ring and the chuck moved to the right of the showing of Figure 3, which will again bring the opposed frusto-conical surfaces of the end 9 and the bore 16 of the head into engagement to separate the four portions of the head radially and cause frictional engagement of said head with the said abrasive ring 21, as shown in Figure 2.

An important feature of the present invention resides in the fact that the clefts or slots 15 extend through the head, its end wall, and a length of the sleeve portion 13, with the result that during rotation of the chuck, there is a forced draft of air through the chuck which maintains the chuck cool, with the consequence that during a grinding operation, heat resultant from said grinding is dissipated.

Dissipation of heat is very important when the device is used for the grinding of dentures. If this heat is not dissipated, warping will occur in the denture, and the present invention, by forcing air through the chuck, maintains the chuck in a cool condition.

As shown, there are very few parts to the present invention, and nothing in the assemblage likely to get out of order or, if, in case of breakage, the parts are easily replaced.

We claim:

A sander chuck as disclosed, including a spindle having at one end a uniform diameter extension and at the opposite end a frusto-conical extension, the body of said spindle between said end portions being of uniform diameter, a chuck carried on the uniform diameter portion of the spindle, the said chuck comprising a sleeve externally screw-threaded inwardly from one end and provided with an externally enlarged diameter portion, there being a freely rotatable ring on the periphery of said sleeve and having one edge portion abutting the enlarged diameter portion of the sleeve, and a cap nut carried on the threaded end of said sleeve and abutting the opposite edge of said ring, the said reduced diameter portion of the end of the spindle passing through said cap nut, the said sleeve of the chuck formed with a cup type head, the head and the sleeve formed with a quadrifid cleft, and the said head formed with a frusto-conical bore for engagement with the frusto-conical extension on the said spindle, axial movement of the chuck upon the said spindle by grasping the said ring, causing radial movement of the head inwardly or outwardly for engagement of the frusto-conical extension of the spindle with the frusto-conical bore of the head.

References Cited in the file of this patent

UNITED STATES PATENTS

| | | |
|---|---|---|
| 1,120,530 | Pieper | Dec. 8, 1914 |
| 2,544,633 | LeCount | Mar. 6, 1951 |

FOREIGN PATENTS

| | | |
|---|---|---|
| 113,110 | Germany | Aug. 30, 1900 |
| 668,286 | Great Britain | Feb. 19, 1901 |